Sept. 6, 1932.  J. N. HOLM  1,875,604
MILKING APPARATUS
Filed Oct. 11, 1928   5 Sheets-Sheet 4
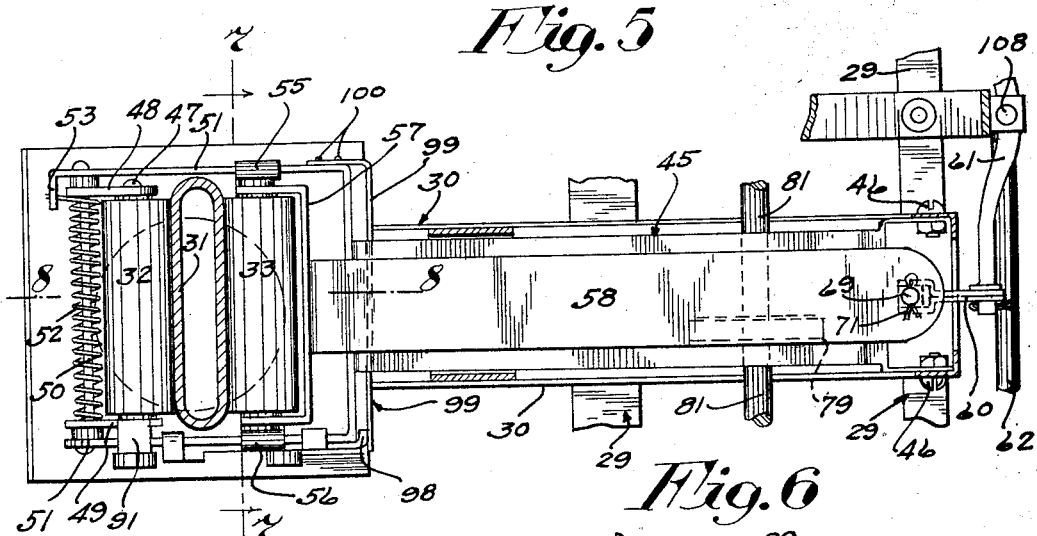
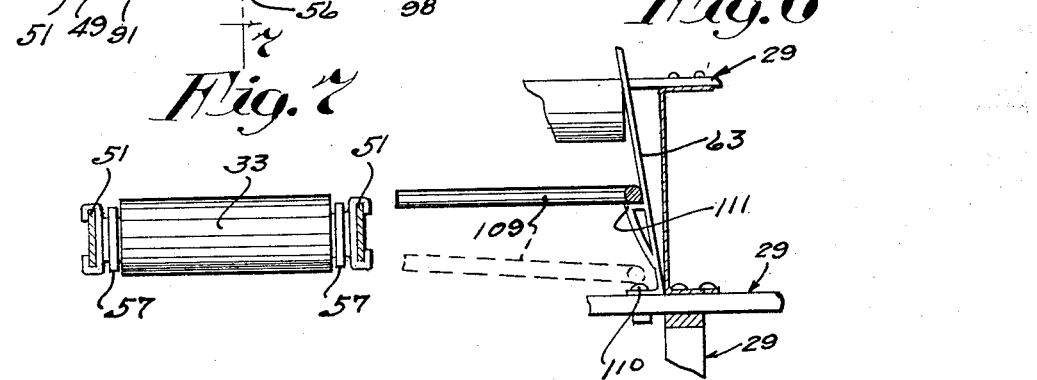
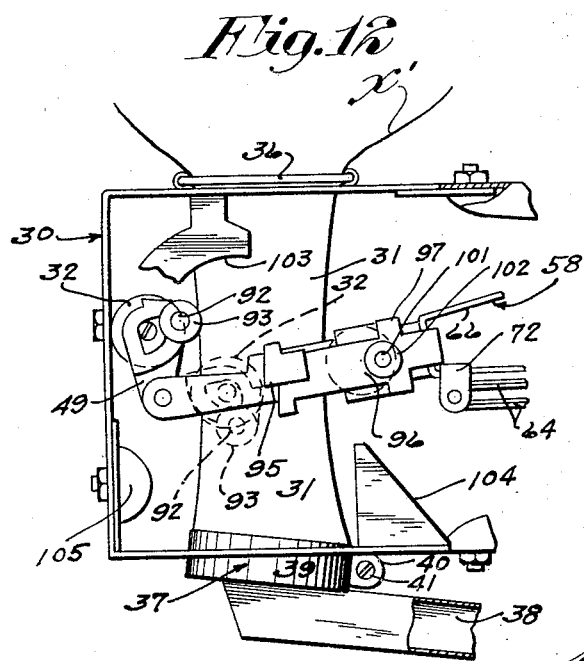
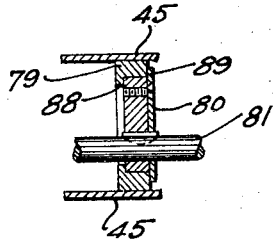
Inventor
John N. Holm
By his Attorneys
Merchant & Kilgore

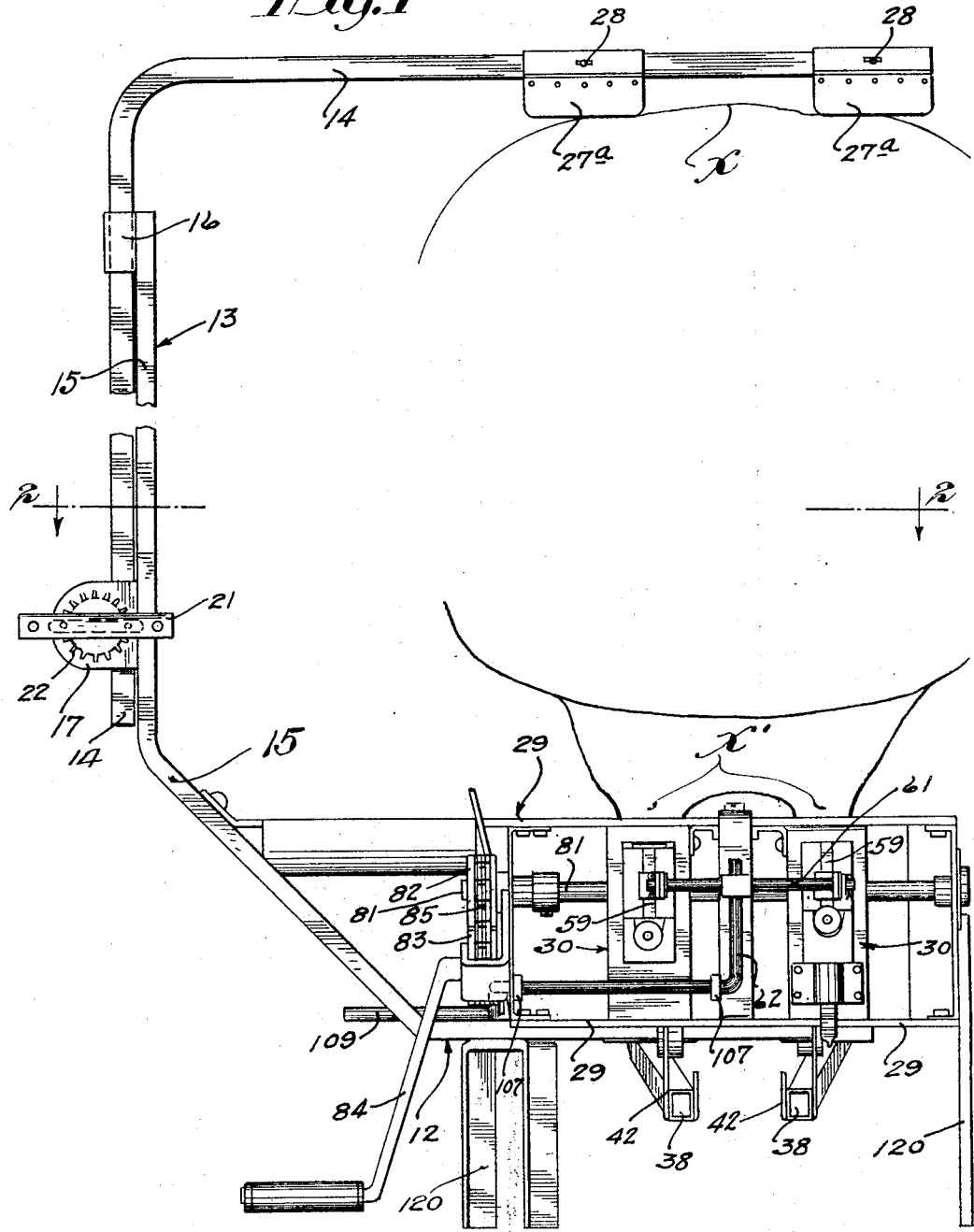

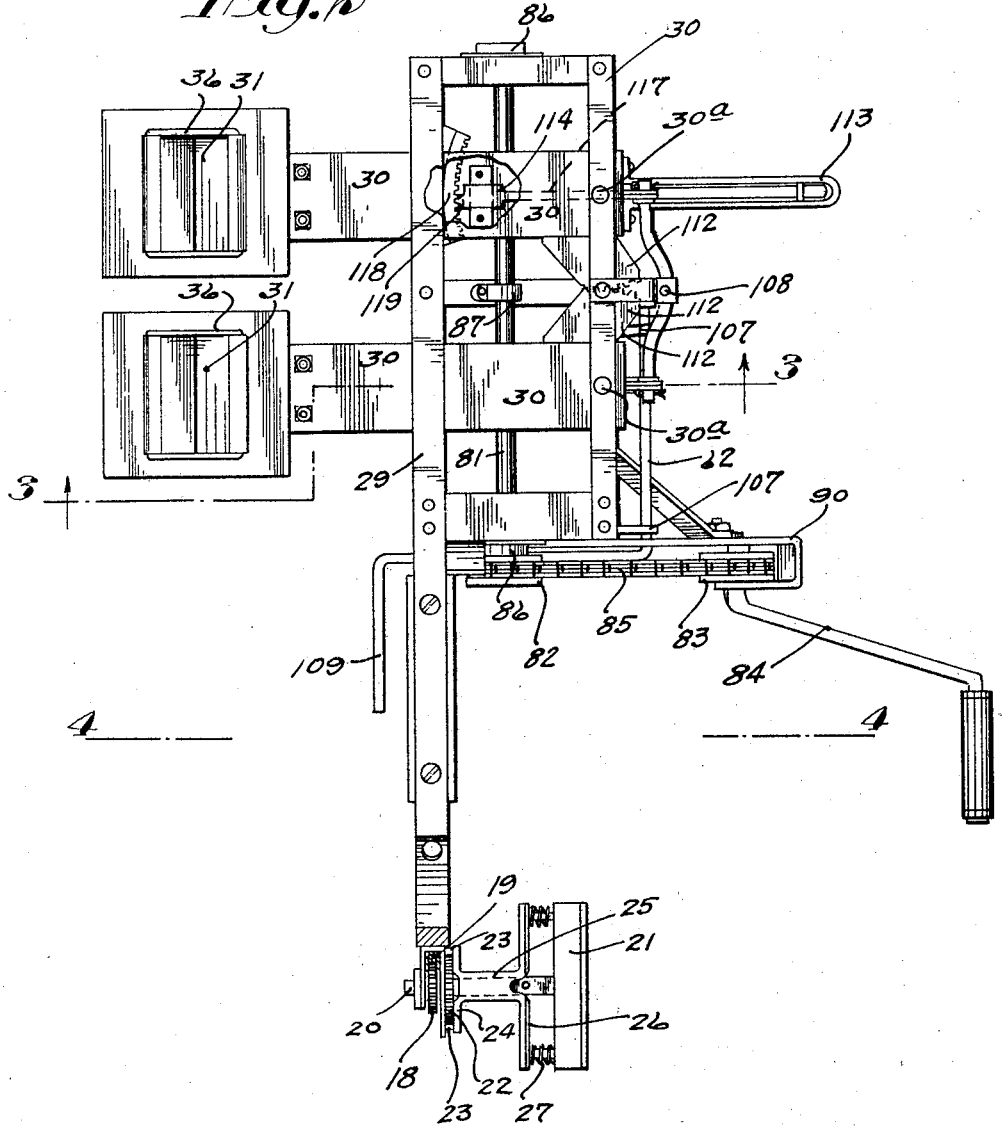

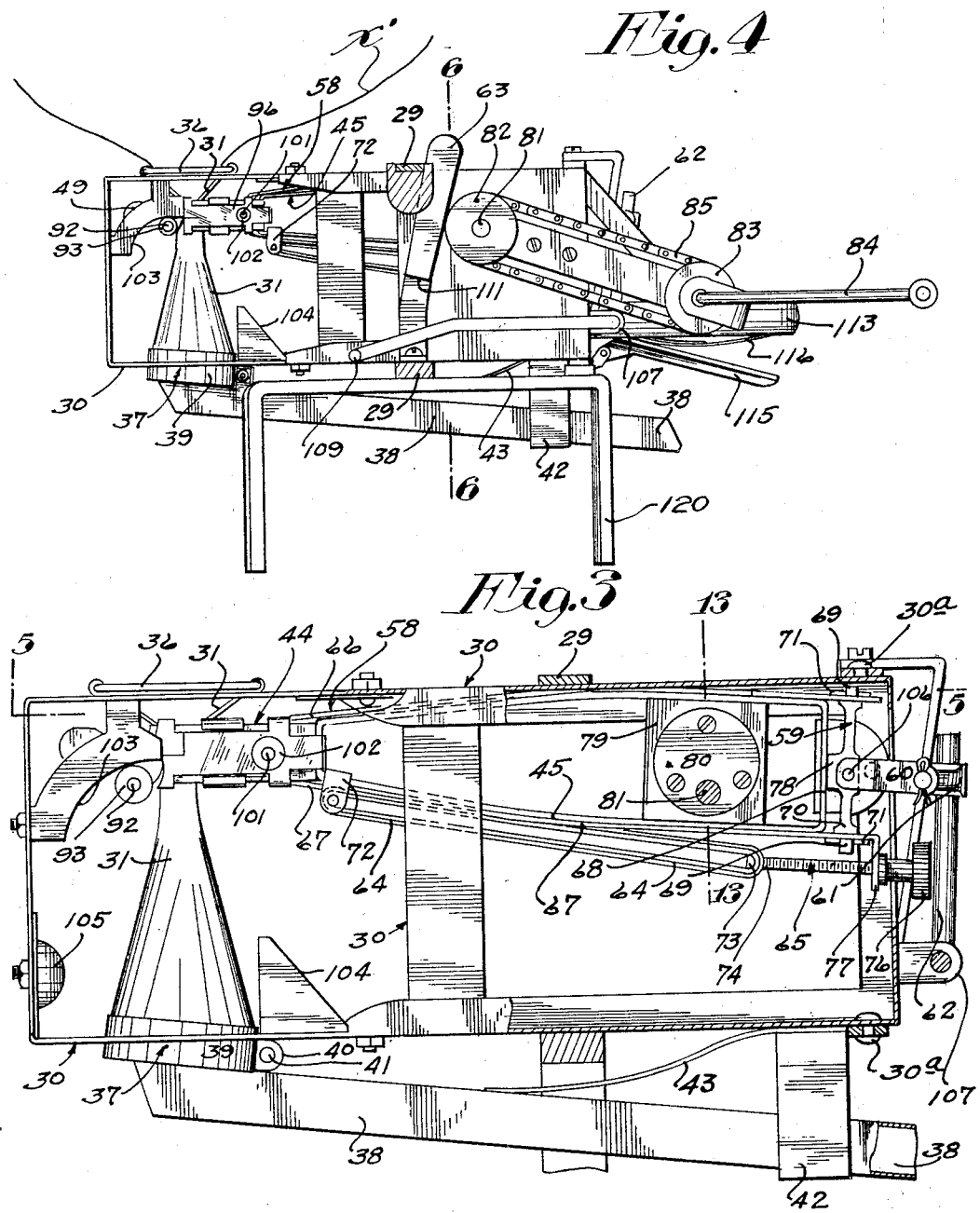

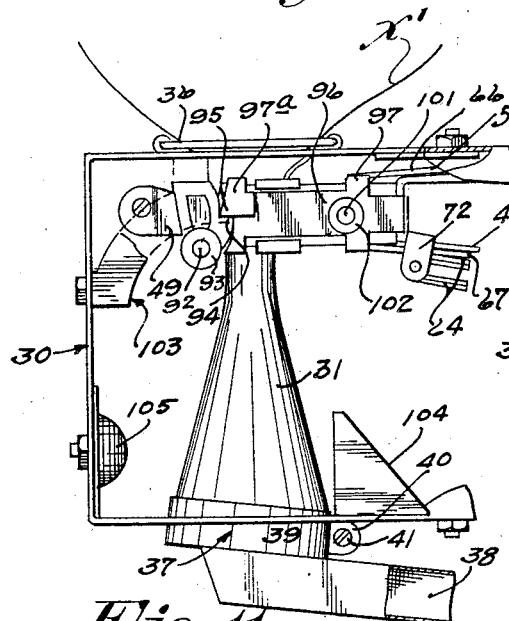

Patented Sept. 6, 1932

1,875,604

UNITED STATES PATENT OFFICE

JOHN N. HOLM, OF MINNEAPOLIS, MINNESOTA

MILKING APPARATUS

Application filed October 11, 1928. Serial No. 311,749.

This invention has for its object to provide a highly efficient, inexpensive and relatively simple milking apparatus, and to such ends the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the device;

Fig. 2 is a plan view of the machine, showing its hanger sectioned on the line 2—2 of Fig. 1;

Fig. 3 is an irregular section taken on the line 3—3 of Fig. 2;

Fig. 4 is a side elevation of the device, some parts being sectioned on the line 4—4 of Fig. 2;

Fig. 5 is a fragmentary section taken on the line 5—5 of Fig. 3;

Fig. 6 is a fragmentary section taken on the line 6—6 of Fig. 4;

Fig. 7 is a section taken approximately on the line 7—7 of Fig. 5;

Fig. 8 is a fragmentary section taken on the line 8—8 of Fig. 5 and showing the rollers in an upper operative position;

Fig. 9 is a fragmentary section corresponding to Fig. 8 but showing the rollers in a downward operative position;

Fig. 10 is a fragmentary side elevation similar to Fig. 8 and showing like parts in like position;

Fig. 11 is a fragmentary side elevation like Fig. 10, but showing the parts of the machine positioned as shown in Fig. 9;

Fig. 12 is a fragmentary side elevation similar to Figs. 10 and 11, but showing the rollers in a retracted position; and Fig. 13 is a section taken on the line 13—13 of Fig. 3.

The exponent X indicates a cow and X' the cow's teats. The milking machine is indicated as an entirety by the numeral 12 and is shown in Fig. 1 in an operative position. When the machine is in an operative position, it is preferably suspended from the cow's back by a vertically adjustable yoke-like hanger 13. The yoke-like hanger 13 includes an inverted L-shaped upper member 14 and a lower member 15 that is formed as an extension of the frame of the machine 12. The vertical portions of these hanger members 14 and 15 are arranged in overlapping parallel arrangement. The vertical portion of the upper member 14 works slidably through a guide 16 on the upper portion of the lower member 15 and also through a combined guide and mounting member 17 on the lower vertical portion of said member 15.

The hanger member 15 and the entire milking machine is adjustable in respect to the hanger member 14 by means of adjusting mechanism including a pinion 18, rack 19, pinion shaft 20 and a handle 21. The rack 19 is formed in the hanger member 15 and the pinion meshes therewith and is secured to the pinion shaft 20 between the sides of the combined guide and mounting member 17, which mounting member is secured to the hanger member 14. The shaft 20 is journaled in the sides of the guide 17. One end of the shaft 20 stands outward from the guide and mounting member 17 and the handle 21 is secured thereto. It will be noted that the shaft 20 is squared or angular between the guide and mounting member 17 and the handle.

Secured to one side of or formed on the mounting member 17 is a toothed hub 22 that is engageable with projections 23 near the end of short outwardly projecting arms 24 formed on an angular sleeve 25 that is slidably mounted on the angular end of the handle-equipped pinion shaft 20 between the guide and mounting member 17 and handle 21. On the outer end of the angular sleeve 20 are formed relatively long arms 26 that are aligned with the handle 21 and which act as finger grips. Between the handle 21 and arms or finger grips 26 are compression springs 27 that normally hold the short arms 24 on the sleeve 25 against the face of the toothed hub 22 and the projections 23 thereon will be held in interlocking engagement with the teeth on said hub 22. In this normal position, the pinion shaft 20 and pinion 18 are held locked against rotary movement and the rack and hanger member 15 are held in a desired vertical adjustment. When the handle 21 and finger grip arms 26 are gripped and drawn toward the handle 21, the projections 23 will be released from their interlocking engagement with the teeth of the toothed hub 22, and the handle 21 may be freely rotated to move the hanger member 14 into a desired vertical adjustment.

Near the free end of the horizontal portion of the hanger member 14 is a pair of spaced pads 27ª that are arranged to rest one on each side of the cow's back in the vicinity of the hips. These pads 27 are slidable adjustably on the hanger members 14 and are normally held positioned by pins 28.

The machine 12 includes a main frame 29, vertically pivoted laterally adjustable frame members 30, teat cups or receptacles 31, and teat-squeezing rollers 32 and 33 that are operative within the frame members 30 and on opposite sides of the teat receptacles 31. The frame arms members 30 are pivoted at their upper and lower rear portions to the main frame 29 at 30ª. In the frame arms 30, near their free ends, are vertically aligned upper and lower openings 34 and 35, respectively, that are adapted to receive opposite ends of the teat receptacles 31.

The teat receptacles 31 are preferably made of rubber or other suitable resilient material and are reinforced and held in an expanded open position at their tops by wire frames or the like 36. As illustrated, the receptacles 31 are split at their sides near their tops and fastened or secured to the wire frames 36 at their front top portions. At their lower ends, the receptacles 31 are drawn around the receiving ends 37 of milk delivery tubes 38 and are held in position thereon by clamping bands 39 that have outturned ends 40 through which nut-equipped bolts are passed. The wire frames 36, at the top of the receptacles 31, are larger than the openings 34 in the tops of the frame arm members 30 and, therefore, when the receptacles are inserted therethrough, their expanded open receiving ends will rest on the tops of the frame members 31. The circular portions of the clamping bands 39 that hold the lower portion of the teat receptacles 31 in position on the receiving ends of the milk delivery troughs or tubes 38 fit in openings 35 in the lower portions of the arm members 30 of the main frame and are spaced only slightly from the sides thereof.

The outturned ends 40 of the clamping bands 39 are preferably pointed in the direction of the delivery end of the tubes or troughs 38 and, when the receptacles 31 and delivery tubes 38 are in their operative positions, said outturned ends project outward beyond the holes 35 and keep the receiving end of said troughs from accidental movement therethrough. In their normal operative positions, as illustrated, the free ends of the delivery tubes 38 are detachably held in position by hook-like brackets 42 and downwardly pressing springs 43. These springs 43 also act to keep the teat receptacles taut.

The teat-squeezing rollers 32 and 33 are movable vertically with and carried by head frames 44 of oscillatory arms 45 that work within the laterally movable vertically pivoted frame members 30, and which oscillatory arms 45 are laterally pivoted to said frame member 30 near their rear portions at 46. Each roller 32 is journalled to a shaft 47 that is mounted at its ends near the outer ends of short arms 48 and 49, which arms are pivoted on a tie rod 50 that connects the outer ends of side members 51 of the oscillatory arm head frames 44. Around each of the tie rods 50 is a coiled spring 52, one end of which engages a turned-over end 53 of one of the side members 51 and the other end of which engages the short pivoted arm 49 that is pivoted to its end of the tie rod 50. The pivoted arms 48 and 49 are thus under spring tension to be moved or maintained in a substantially vertical position, and in which position of the arms 48 and 49, the rollers will be inoperative on the receptacles 31 and teat X'.

The rollers 33 are each mounted on a short shaft 54 that is journaled at its ends in guides 55 and 56 that are slidably mounted one on each of the side members 51 of the oscillatory arm head frames 44 for forward and rearward sliding movements. The rollers 33 are resiliently maintained in a forward position when the machine is in operation, but are retracted when inoperative to allow the teats to be easily inserted into or withdrawn from the receptacles 31.

The mechanism for resiliently holding the rollers 33 in a forward operative position and for retracting the same to an inoperative position away from their cooperating rollers 32 includes head yokes 57, strap-like sliding frames 58, swivel connections 59, links 60, an equalizer 61, an operating lever 62, a lever-locking device 63, a forwardly pulling tension device 64, and a tension-device-adjusting means 65. The opposed outer end portions of each of the head yokes 57 are loosely mounted on a cooperative roller shaft 54 between the ends of the rollers 33 and guides 55 and 56.

The head yokes 57 are secured to the outer ends of and movable with the strap-like sliding frames 58, which frames work slidably forward and rearward over the oscillatory arms 45. The sliding frames 58, as shown, each include a rearwardly projecting upper member 66 and a rearwardly projecting lower member 67. These upper and lower rearwardly projecting sliding members 66 and 67 project slightly beyond vertical rear portions 68 of the oscillatory arms 45 and are connected by the vertical swivel connections 59. The swivel connections 59 are reduced at their opposite ends to form trunnions 69 that work pivotally in suitable holes in the upper and lower members 66 and 67 beyond the rear portions 68 of the oscillatory arms 45, and said swivel connections are held against axial movements by shoulders 70 on the swivels 59 and pins or the like 71 passed through the outer ends of the trunnions 69.

The resilient tension devices 64 are, preferably and as illustrated, each made up of two endless relatively wide rubber bands, one within the other, but they may, of course, be in the form of metallic springs or other suitable devices. The rubber bands of the tension devices 64 are connected at their front ends to small brackets 72 that are secured to the front portions of the oscillatory arms 45. At their rear portions, the tension devices 64 are connected to the front ends or heads 73 of the tension-device-adjusting devices 65, which adjusting devices each include a screw-threaded stem 74, a head 73 and a finger nut 76 on the outer end of the stem 74.

The stem 74 is passed through and is loose in a hole in a downturned lug-like portion 77 formed on the rear end of the lower member 67 of the sliding frame 58, and the finger nut 76 engages the rear face of said lug 77. The sliding frame 58 will thus, at all times, be under tension to be moved into a forward foremost position on their oscillatory arms 45 and the head yokes 57 on the front thereof, and the roller 33 will normally be maintained in a forward position but may be moved rearward by pressure between the rollers 32 and 33 or by manipulation of the roller-retracting lever 62. The sliding frames 58 are limited in their forward movement by engagement of lugs 78 that are formed on the front intermediate portions of the swivels 59 with the vertical back portions 68 of the oscillatory arms 45. The oscillatory arms 45 are movable pivotally up and down within the vertically pivoted frame arm members 30 at the same time but in opposite directions, that is, one of the oscillatory arms moves upward while the other moves downward. As will later be described, the rollers 32 and 33 are operative on the teats on their downward movement, but are inoperative thereon on their upward movement.

The mechanism illustrated for operating the oscillatory arms 45 includes square eccentric straps 79, eccentrics 80, an eccentric shaft 81, a driven sprocket 82 on one end of the eccentric shaft 81, a drive sprocket 83 mounted on the journaled end of a hand-operated crank 84 and a chain 85 running over the sprockets 82 and 83.

The eccentric shaft 81 is journaled near its ends in bearings 86 and near its central portion in a bearing 87, and the eccentrics 80 are mounted on said shaft 81 for rotary movements therewith. These eccentrics 80 work within the eccentric straps 79 and are held against endwise sliding movements therein by enlarged portions or shoulders 88 formed on one side thereof and retaining plates 89 on the opposite sides thereof. By reference to the drawings, it will be seen that the square eccentric straps 79 work between upper and lower members of the oscillatory arms 45. The sprocket 82 is mounted on one end of the eccentric shaft 81 and is driven by the chain 85 from the drive sprocket 83. The end of the crank 84 on which the drive sprocket is mounted is journaled in an outward extension 90 of the main frame 12 on opposite sides of the sprocket 83. When the crank 84 is operated, the action of the eccentrics will cause the squeezing rollers 32 and 33 to move upward and downward.

The rollers 32 are thrown into their operative squeezing positions at the top of their upward stroke, as shown in Figs. 8 and 10, and they remain in that position on their downward stroke but are thrown into an inoperative position at the end thereof, as shown in Figs. 9 and 11. The rollers 32 remain in their inoperative positions until they reach the top of their upward stroke. The complete mechanism for causing the rollers 32 to move from their operative to their inoperative positions as described above will next be described.

Formed on the outer end of the short pivoted links 49, opposite the rollers 32, are turned-over portions 91, which, when the rollers are in their inoperative positions, overlie the sides of the arms 49 of the head frames 44. Journaled near the lower sides of the turned-over portions 91 at 92 are small rollers 93.

Formed on the outer ends of the turned-over portions 91 of the links 49 are projections or latch members 94 that are engageable by cooperating latch members 95 formed on the outer ends of spring-pressed slides 96. These slides 96 are mounted on the arms 49 of the head frames 44 and are held thereon by turned-over guide portions 97ª. The rear ends of the slides 96 project slightly beyond and are turned over to form stops 98 that engage the rear portions of the head frames 44 when they are in their forward positions. The turned-over stops 98 are each engaged by a spring 99 that is secured to the opposite side of the head frame 44 by rivets or the like 100. These springs normally keep the stops 98 against the back of the head frames 44 and the slides 96 in a forward position. Journaled to the side of the slide 96 at 101 is a roller 102. The latch members 95 are engageable with the cooperating latch members 94 when the slides 96 are in their foremost positions to hold their cooperating squeezing rollers 32 in an operative position, but will release their respective latch member 94 and allow the cooperating squeezing roller 30 and links 49 and 48 to turn pivotally upward and outward to an inoperative position when the slides are moved rearward against the action of the spring 99.

The teat-squeezing rollers 32 are in their unlatched outward and upward inoperative positions on the major portion of their upward stroke, but when they get close to the top thereof, the small rollers 92 on the overturned portions 91 of the short links 49 will engage upwardly and inwardly curved cam surfaces 103 on the sides of the frame arm members 30.

Continued upward movement of the oscillatory arm 45 and head frame 44 will cause the small rollers 102 to follow their cooperating cam surfaces 103, throw the roller 32 inward and downward to an operative position, as shown in Figs. 8 and 10, and the latch members 94 and 95 will become operatively engaged, as shown most clearly in Fig. 10. The rollers 32 are in their closed operative positions through the major portion of their downward stroke. When the squeezing mechanism nears the bottom of its downward operative stroke, the small roller 102 on the side of the slide 96 will engage a rearwardly and downwardly inclined cam surface 104 on the side of the frame members 30. The roller 102 will thus, upon slight further downward movement, follow the cam surface 104 in a rearward direction and cause the slide 96 to move backward against the action of the spring 99 and disengage the cooperating latch members 94 and 95 and release the roller 32 that is effected thereby. When the roller 32 is released, it will be turned pivotally upward and outward by the action of the coiled spring 52 against a rubber buffer 105.

The links 60 are pivoted to the swivels 59 near their central portions at 106 and extend outward therebeyond and are connected together at their outer ends by the equalizer 61. The operating lever 62 is mounted on the main frame 12 in suitable bearings 107 and is turned upward near the rear central portion of the machine and is passed through and is loose in a hole in the center of the equalizer 61 at 108. When the free end or handle of the lever 62, indicated by the numeral 109, is raised, the sliding frames 58 will be pulled rearward and the rollers 33 retracted to an inoperative position.

At one side of the lever 62 is the lever-locking device 63, which device is in the form of a metallic spring secured to the main frame at 110 and having a shoulder 111 thereon. The locking device 63 is under tension to be moved outward. When the handle end of the lever 62 is raised to a position in which the rollers 33 are retracted as shown in Fig. 12, the shoulder 111 will project under the lever 62 and hold the same in an inoperative position until the upper end of the locking device is pushed inward. The resilient tension devices 64 will return the rollers 32 and retracting mechanism to their normal positions when the lever 62 is released from the shoulder 111.

When the teats are to be inserted into or withdrawn from the receptacles 31, both of the rollers 32 should be in their inoperative positions and both of the rollers 33 should be in their retracted inoperative positions. No matter what position the oscillatory arms 45 are in when the machine is stopped, one of the rollers 32 will be in its operative latched position, and the other will be in its inoperative unlatched position. By reference to Fig. 12, it will be noted that when the rollers 33 are retracted by manipulation of the operating lever 62, the guides 56 will be slid inward on the side members 51 and will engage the guides 97 on the slides 96 and move the slides inward to such an extent as to disengage the cooperating latch members 94 and 95 and allow the roller 32 that is in its operative position to move to its inoperative position.

The mechanism illustrated is adapted to milk two teats at one time. If the two teats to be milked are close together, the vertically pivoted laterally adjustable frame members 30 will be in a substantially parallel position, as shown in Fig. 2, and if the teats to be milked are relatively far apart, the arms 30 may be moved pivotally outward away from one another. By reference to Figure 2, it will be seen that each of the pivoted frame members 30 have a segmental gear projection 112 opposite their pivot points 30a. The teeth of each of these opposed segmental gear projections 112 engage with the teeth of the other and cause the members 30 to move pivotally the one with the other.

Extending outward from the back of one of the members 30 is a handle 113. This handle 113 is adapted to be manipulated to move the members 30 pivotally toward or away from one another. To releasably lock the members 30 in a desired pivotal position, I have provided a locking mechanism indicated as an entirety by the numeral 114. The locking mechanism 114 includes a spring-pressed finger grip 115 directly under and pivoted to the handle 113, a spring 116, a plunger 117 operated by the finger grip 115, a toothed rack-like member 118, and a rack-engaging dog 119 on the end of the plunger 117.

It is important to note that the frame members 30 may be moved pivotally to accommodate teats of various different spacings without effecting the operation of the machine. By reference to dotted lines in Fig. 5, it will be seen that the eccentrics 80 and square eccentric straps 97 are operative between the upper and lower members of the oscillatory arms 45 near the outer side portions thereof when said arms 30 are in a substantially parallel position. When the members 30 are moved pivotally outward, the oscillatory arms will move therewith and the eccentric straps will work between the upper and lower members of the oscillatory arms near their central or inner side portions.

The rollers 32 and 33 are preferably made of soft resilient rubber that will, when in operation on the teats, conform to some extent to the shape thereof. With these soft rollers and by obtaining proper squeezing pressure on the rollers 33 by adjustment of the tension devices 64, a cow may be stripped day after day by this machine without receiving any injury.

A working model of the device described has been built and, in practice, has been found highly practical.

My milking apparatus is illustrated and described as being suspended from a cow's back but it should be understood that it may, if desired, be suspended from any suitable overhead structure or supported from the ground on suitable legs or the like 120.

What I claim is:

1. In a milking apparatus, a frame member, an arm-like member pivoted near one end to the frame member and movable pivotally up and down, a U-shaped head frame on the free end of said arm, cooperating opposed teat-squeezing rollers carried by and movable with the head frame of the pivoted arms, a resilient teat receptacle between the cooperating teat-squeezing rollers, means for moving the pivoted arms up and down, one of said rollers being slidably mounted at its ends on opposite sides of the U-shaped head frame, a resilient tension device for normally holding the slidably mounted roller in an operative position and the other of said teat-squeezing rollers being carried by said head frame for pivotal movements toward or away from its cooperating slidably mounted roller.

2. In a milking apparatus, a frame member, an arm-like member pivoted near one end to the frame member and movable pivotally up and down, a head frame on the free end of said arm, co-operating opposed teat-squeezing rollers carried by and movable with the head frame of the pivoted arms, a resilient teat receptacle between the co-operating teat-squeezing rollers, means for moving the pivoted arms up and down, one of said rollers being slidably mounted at its ends on opposite sides of the head frame, a resilient tension device for normally holding the slidably mounted roller in an operative position, the other of said teat-squeezing rollers being carried by said head frame for pivotal movements toward or away from its co-operating slidably mounted roller, and means for moving the said slidably mounted roller against the action of the resilient tension device, to an inoperative position.

3. In a milking apparatus, a frame, an arm-like member pivoted near one end to the frame for pivotal up and down movements, a head frame near the free end of said arm, co-operating teat-squeezing rollers carried by and movable with the head frame of the pivoted arm, a resilient teat receptacle between the co-operating teat-squeezing rollers, means for moving the pivoted arm up and down, the innermost of said rollers being slidably mounted in respect to said head frame for movements toward and away from the outer roller, tension means for normally resiliently holding said inner roller in an outer operative position, the outer of said rollers being carried by said head frame for pivotal movements toward and away from the co-operating inner roller, means for moving said outer roller pivotally toward the inner roller for squeezing action on a teat in the receptacle near the top of its upward stroke, means for keeping pivotally mounted outer roller in an operative squeezing position during the major portion of its downward movement, and means for causing said outer roller to move pivotally away from its co-operating inner roller to an inoperative position near the bottom of its downward stroke and retaining the same in an inoperative position during its upward movement.

4. In a milking apparatus, an arm member mounted for oscillatory up and down movements, co-operating opposed teat-squeezing rollers carried by said arm near the free end thereof for oscillatory movements therewith, one of said rollers being mounted for pivotal movements in respect to said arm toward and away from the other roller, tension means tending to move said pivotally mounted roller away from the other roller to an inoperative position, cam means arranged to move said pivotally mounted roller to an operative position near the top of its upward stroke, latch means for holding said roller in an operative position during the major portion of its downward movement, and means for automatically releasing said latch and permitting the tension means to move said roller pivotally to an inoperative position near the bottom of its downward stroke.

5. In a milking apparatus, an arm member mounted for oscillatory up and down movements, co-operating opposed teat-squeezing rollers carried by said arm near the free end thereof for oscillatory movements therewith, one of said rollers being mounted for pivotal movements in respect to said arm toward and away from the other roller, tension means tending to move said pivotally mounted roller away from the other roller to an inoperative position, cam means arranged to move said pivotally mounted roller to an operative position near the top of its upward stroke, latch means for holding said roller in an operative position during the major portion of its downward movement, and cam means for automatically releasing said latch and permitting the tension means to move said roller pivotally to an inoperative position near the bottom of its downward stroke.

6. In a milking apparatus, a resilient teat receptacle, a pivoted arm-like member movable pivotally up and down, cooperating teat-squeezing elements operative on opposite sides of the receptacle and movable with the free end of said pivoted arm between the ends of the receptacle, means for moving one of the elements toward the other for squeezing action on a teat in the receptacle at the top of the upward stroke, means for keeping said moved element in an operative position during its downward movement, means for causing said moved element to return to an inoperative position at the bottom thereof and remain inoperative during its upward movement, means whereby the other of said elements is normally resiliently held in an operative position for exerting a yielding pressure on a teat in the receptacle, and means for rendering said elements inoperative on the teat irrespective of their up and down positions in respect thereto.

7. In a milking apparatus, a resilient teat receptacle, a pivoted arm-like member movable pivotally upon and down, cooperating teat-squeezing elements operative on opposite sides of the receptacle and movable with the free end of said pivoted arm between the ends of the receptacle, means for moving one of the elements toward the other for squeezing action on a teat in the receptacle at the top of the upward stroke, means for keeping said moved element in an operative position during its downward movement, means for causing said moved element to return to an inoperative position at the bottom thereof and remain inoperative during its upward movement, and means for rendering said elements inoperative on the teat irrespective of their up and down positions in respect thereto.

8. In a milking apparatus a main frame, a frame arm projecting from said main frame and pivoted thereto for lateral swinging movements, a resilient teat receptacle carried by said frame arm near the free end thereof, an oscillatory arm carried by said pivoted frame arm for lateral swinging movements therewith and vertical oscillatory movements in respect thereto, cooperating teat-squeezing elements carried by said oscillatory arm near the free end thereof and on opposite sides of said teat receptacle and adapted to be moved with said arm intermediate the ends of said receptacle, means for imparting oscillatory movements to said oscillatory arm, means for moving one of said elements toward the other for squeezing action on a teat in the receptacle during the downward movement of said elements, and means for rendering said elements inoperative on the teat in the receptacle on their upward movement.

9. In a milking apparatus, a main frame, a pair of frame arms projecting from said main frame and vertically pivoted thereto for lateral swinging movements toward and away from one another, a resilient teat receptacle carried by each of said pivoted frame arms near the free ends thereof, an oscillatory arm horizontally pivoted to each of said pivoted frame arms near their pivoted portions and arranged to partake of lateral pivotal movements therewith and to oscillate vertically in respect thereto, and opposed teat-squeezing elements on opposite sides of said teat receptacle and carried by the free end portion of said oscillatory arm for upward and downward movements intermediate the ends of said receptacle.

10. In a milking apparatus a frame member, an arm-like member mounted for upward and downward pivotal movements, cooperating opposed teat-squeezing elements carried by and movable with a free end portion of said pivoted arm, means for imparting upward and downward pivotal movements to said pivoted arm, one of said elements being mounted for sliding movements in respect to said arm toward and away from its cooperating element and the other of said elements being mounted for pivotal movement in respect to said arm toward and away from its cooperating slidably mounted element, and means for maintaining said slidably mounted element in an operative teat-squeezing position or retracting the same slidably to an inoperative position to permit free insertion of a teat.

11. In a milking apparatus an arm-like member mounted for vertical upward and downward movements, means for imparting upward and downward movements to said arm, opposed teat-squeezing elements carried by the free end portion of said arm and adapted to have a teat interposed therebetween and to be moved by said arm intermediate the ends of the teat, one of said elements being mounted for pivotal movements in respect to said pivoted arm and adapted to be moved pivotally into close cooperative relation to the other of said elements or away therefrom to an inoperative position, spring means normally tending to move said pivotally mounted elements to an inoperative position, cam means operative to move said pivotally mounted element to an operative position near the top of its upward stroke, latch means operative to maintain said pivotally mounted element in an operative position during the major portion of its downward stroke, and cam means operative to release said latch and permit said pivotally mounted element to be moved to an inoperative position during its upward stroke.

In testimony whereof I affix my signature.

JOHN N. HOLM.